United States Patent
Hashimoto et al.

(10) Patent No.: US 11,312,360 B2
(45) Date of Patent: Apr. 26, 2022

(54) CONTROL SYSTEM FOR VEHICLE

(71) Applicant: TOYOTA JIDOSHA KABUSHIKI KAISHA, Toyota (JP)

(72) Inventors: Hiroto Hashimoto, Atsugi (JP); Terufumi Miyazaki, Toyota (JP); Tomohito Ono, Susono (JP); Yosuke Suzuki, Hadano (JP); Daisuke Shirai, Sutno-gun (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 101 days.

(21) Appl. No.: 16/578,464

(22) Filed: Sep. 23, 2019

(65) Prior Publication Data
US 2020/0164855 A1    May 28, 2020

(30) Foreign Application Priority Data
Nov. 22, 2018  (JP) .............................. JP2018-219167

(51) Int. Cl.
*B60W 20/12*    (2016.01)
*B60L 58/12*    (2019.01)
(Continued)

(52) U.S. Cl.
CPC .............. *B60W 20/12* (2016.01); *B60K 6/46* (2013.01); *B60L 58/12* (2019.02); *B60W 10/06* (2013.01);
(Continued)

(58) Field of Classification Search
CPC .. B60W 20/12; B60W 20/13; B60W 2552/05; B60W 2710/244; B60W 20/10;
(Continued)

(56) References Cited

U.S. PATENT DOCUMENTS 5,778,326 A * 7/1998 Moroto ................... B60L 50/16
                                                                701/22
5,832,396 A * 11/1998 Moroto ................... B60L 50/16
                                                                701/22
(Continued)

FOREIGN PATENT DOCUMENTS

JP         2004166392 A  *  6/2004
JP         2004236472 A  *  8/2004
(Continued)

OTHER PUBLICATIONS

EPO machine translation of JP 2009-279989 (original JP document published Dec. 3, 2009) (Year: 2009).*
(Continued)

*Primary Examiner* — David A Testardi
(74) *Attorney, Agent, or Firm* — Oliff PLC

(57) ABSTRACT

If the destination has not been input, it is judged whether the present location is on the expressway (step S32). If the judgement result of the step S32 is positive, it is judged whether or not the actual SOC is less than or equal to the threshold TH2 (step S34). If the judgement result of the step S34 is positive, the restoring control is executed (step S36). Subsequent to the step S34 or S36, it is judged whether or not the vehicle is still on the expressway (step S38). If the judgement result of the step S38 is positive, it is judged whether or not the actual SOC is greater than or equal to the SOC_T2 (step S42). If the judgement result of the step S42 is positive, the maintaining control is executed (step S44).

7 Claims, 6 Drawing Sheets

(51) Int. Cl.
*B60W 20/10* (2016.01)
*B60W 10/06* (2006.01)
*B60W 10/08* (2006.01)
*H02J 7/14* (2006.01)
*B60K 6/46* (2007.10)
*B60K 6/26* (2007.10)
*G01C 21/34* (2006.01)

(52) U.S. Cl.
CPC ............ *B60W 10/08* (2013.01); *B60W 20/10* (2013.01); *H02J 7/1415* (2013.01); *B60K 6/26* (2013.01); *B60W 2510/244* (2013.01); *B60W 2710/06* (2013.01); *B60W 2710/08* (2013.01); *B60Y 2200/92* (2013.01); *G01C 21/34* (2013.01); *G01C 21/3415* (2013.01)

(58) Field of Classification Search
CPC .......... B60L 58/12; B60L 58/13; B60L 58/14; B60L 58/15; G01C 21/3469
See application file for complete search history.

(56) References Cited

U.S. PATENT DOCUMENTS

| | | | | |
|---|---|---|---|---|
| 6,166,449 A | * | 12/2000 | Takaoka | B60W 10/08 290/40 B |
| 2002/0107618 A1 | * | 8/2002 | Deguchi | B60W 50/0097 701/22 |
| 2003/0015358 A1 | * | 1/2003 | Abe | B60W 10/06 180/65.25 |
| 2004/0230376 A1 | * | 11/2004 | Ichikawa | G01C 21/26 702/2 |
| 2009/0277701 A1 | * | 11/2009 | Soma | B60W 10/26 180/65.25 |
| 2010/0131139 A1 | * | 5/2010 | Sakai | B60L 3/12 701/22 |
| 2012/0032637 A1 | * | 2/2012 | Kotooka | B60W 10/08 320/109 |
| 2014/0288742 A1 | * | 9/2014 | Hokoi | B60W 20/12 701/22 |
| 2015/0057860 A1 | * | 2/2015 | Katakura | B60L 50/16 701/22 |
| 2015/0274028 A1 | * | 10/2015 | Payne | B60L 53/00 701/22 |
| 2015/0298570 A1 | * | 10/2015 | Hisano | B60K 6/445 701/22 |
| 2016/0167641 A1 | * | 6/2016 | Yoon | G08G 1/09626 701/22 |
| 2016/0236586 A1 | * | 8/2016 | Soo | B60L 58/13 |
| 2016/0264124 A1 | * | 9/2016 | Hotta | B60K 6/445 |
| 2016/0325726 A1 | * | 11/2016 | Liang | B60W 20/12 |
| 2016/0375789 A1 | * | 12/2016 | Park | B60W 20/10 701/22 |
| 2017/0088117 A1 | * | 3/2017 | Ogawa | B60W 20/12 |
| 2018/0334157 A1 | * | 11/2018 | Tanaka | B60K 6/20 |
| 2019/0077273 A1 | * | 3/2019 | Jang | B60L 50/60 |
| 2019/0329661 A1 | * | 10/2019 | Yum | B60L 50/60 |
| 2020/0346633 A1 | * | 11/2020 | Sakashita | B60W 20/13 |

FOREIGN PATENT DOCUMENTS

| | | | | | |
|---|---|---|---|---|---|
| JP | 2005160269 A | * | 6/2005 | ............ | B60W 20/12 |
| JP | 2007050888 A | * | 3/2007 | | |
| JP | 2008260361 A | * | 10/2008 | | |
| JP | 2009001049 A | * | 1/2009 | | |
| JP | 2009-029154 A | | 2/2009 | | |
| JP | 2009029154 A | * | 2/2009 | ............ | B60W 20/00 |
| JP | 2009279989 A | * | 12/2009 | ............ | B60W 20/12 |
| JP | 2010-143310 A | | 7/2010 | | |
| JP | 2016-165918 A | | 9/2016 | | |

OTHER PUBLICATIONS

Campbell, R.B., "STAT 1772: Introduction to Statistical Methods", Lecture summaries, Frequency distributions, Aug. 2013, 5 pages (Year: 2013).*
Espacenet translation of JP2019143316A (original JP documnent published Jul. 1, 2010).

* cited by examiner

10 ENGINE
12 MOTOR FOR ELECTRICAL POWER GENERATION
14 MOTOR FOR DRIVING
16 BATTERY
20 WHEEL
22, 24 INVERTOR
26 BATTERY CHARGER
28 MOTOR/GENERATOR CONTROLLER
30 ENGINE CONTROLLER
32 BATTERY CONTROLLER
34 NAVIGATION CONTROLLER
36 UNIFIED CONTROLLER

S10 IS PRESENT LOCATION IS ON EXPRESSWAY?
S12 IS ACTUAL SOC≦TH1?
S14 EXECUTE RESTORING CONTROL
S16 HAS VEHICLE REACHED SCHEDULED EXIT?
S18 TERMINATE ONGOING SOC MANAGEMENT CONTROL
S20 IS ACTUAL SOC≧SOC_T1
S22 EXECUTE MAINTAINING CONTROL

S30 HAS DESTINATION NOT BEEN INPUT?
S32, S38 IS PRESENT LOCATION ON EXPRESSWAY?
S34 IS ACTUAL SOC≦TH2?
S36 EXECUTE RESTORING CONTROL
S40 TERMINATE ONGOING SOC MANAGEMENT CONTROL
S42 IS ACTUAL SOC≧SOC_T2
S44 EXECUTE MAINTAINING CONTROL

CONTROL SYSTEM FOR VEHICLE

CROSS-REFERENCE TO RELATED APPLICATION

The present application claims priority under 35 U.S.C. § 119 to Japanese Patent Application No. 2018-219167, filed Nov. 22, 2018. The contents of this application are incorporated herein by reference in their entirety.

BACKGROUND

Field

Present disclosure relates to a control system for vehicle.

Background

JP2016-165918A discloses a control system for vehicle. The vehicle includes an engine, a motor/generator, a battery, a controller, and a navigation system. The engine is powered by fuel. The motor/generator generates power by electrical power supplied from the battery. The controller manage a state of charge of the battery (hereinafter also referred to as a "SOC"). The navigation system combines information on the present location and map information to provide travel guidance.

When a destination is set by a user, the navigation system guides a travel route from the present location to the destination. When an expressway is contained in the travel route, the controller executes restoring control in which the SOC is restored during the vehicle travels on the expressway. In the restoring control, a target value of the SOC in case of the vehicle passing through an exit of the expressway is set, and operating points of the engine are set based on this target value. According to the execution of the restoring control, it is possible to secure the travel from the exit of the expressway to the destination.

However, the restoring control is executed on an assumption that the destination is set. Therefore, when the destination is not set, there is a possibility that the target value of the SOC is not set or the restoring control is not executed.

SUMMARY

The present disclosure addresses the above described problem, and one object of the present disclosure is to provide a technique capable of executing the restoring control during the vehicle travels on the expressway even when the destination is not set by the user.

The first aspect is a control system for vehicle for solving the problem described above.

The control system comprises an engine, a battery, a motor, a generator, a management controller, and a navigation controller.

The engine and the battery are mounted on a vehicle.

The motor is mechanically coupled to drive wheels of the vehicle. The motor is configured to receive electrical power from the battery and generate a driving force for travel of the vehicle.

The generator is mechanically coupled to the engine. The generator is configured to generate charging power of the battery with power of the engine.

The management controller is configured to execute management control in which a state of charge of the battery is managed.

The navigation controller is configured to guide a travel route of the vehicle from a present location to a destination based on information on the present location and map information.

The management control includes restoring control. The restoring control is control in which the engine is operated such that the state of charge is restored to a restoring target value being set based on an actual state of charge of the battery when the actual state of charge is equal to or less than a lower limit value.

In the restoring control, the management controller is configured to:

judge whether or not the present location is on an expressway based on the information on the present location and map information;

judge whether or not a destination has been entered into the navigation controller;

if it is judged that the present location is on the expressway and the destination has been input, set a first target value as a restoring target value in case of the vehicle passing through a scheduled exit of the expressway; and if it is judged that the present location is on the expressway and the destination has not been input, set a second target value as the restoring target value in case of the vehicle passing through a next exit of the expressway.

The second aspect further has the following feature in the first aspect.

The second target value is higher than the first target value.

The third aspect further has the following features in the first aspect.

The lower limit value includes a first lower limit value and a second lower limit value. The first lower limit value is a value of the state of charge that is set when the destination has been input and the present location is on the expressway. The second lower limit value is a value of the state of charge that is set when the destination has not been input and the present location is on the expressway.

The second lower limit value is higher than the first lower limit value.

The fourth aspect further has the following features in the third aspect.

The lower limit value further includes a third lower limit value. The third lower limit value is a value of the state of charge that is set when the present location is not on the expressway.

The first and second lower limit values are higher than the third lower limit value.

The fifth aspect further has the following features in the first aspect.

The management control further includes maintaining control. The maintaining control is control in which the state of charge is maintained at an upper limit value when the actual state of charge is greater than or equal to the upper limit value.

The sixth aspect further has the following features in the fifth aspect.

The upper limit value includes a first upper limit value and a second upper limit value. The first upper limit value is a value of the state of charge that is set when the destination has been input and the present location is on the expressway. The second upper limit value is a value of the state of charge that is set when the destination has not been input and present location is on the expressway.

The second upper limit value is higher than the first upper limit value.

The seventh aspect further has the following feature in the first aspect.

The vehicle is a series hybrid vehicle.

According to the first aspect, when it is judged that the present location is on the expressway and the destination has been input, the first target value is set as the restoring target value in case of the vehicle passing through the scheduled exit of the expressway. Further, when it is judged that the present location is on the expressway and the destination has not been input, the second target value is set as the restoring target value in case of the vehicle passing through the next exit of the expressway. Therefore, it is possible to execute the restoring control during the vehicle travels on the expressway regardless of whether or not the destination has been input.

According to the second aspect, the second target value which is set when the destination has not been input is higher than the first target value which is set when the destination has been input. Therefore, in a case where the destination has not been input, the state of charge is restored more than the case where the destination has been input. Therefore, it is possible for the vehicle, after the travel on the expressway, to continue to travel for a long time only by driving the motor.

According to the third aspect, the second lower limit value which is set when the destination has not been input is higher than the first lower limit value which is set when the destination has been input. Therefore, in the case where the destination has not been input, it is possible to start the restoring control earlier than the case where the destination has been input. Therefore, it is possible to restore the state of charge earlier.

According to the fourth aspect, the first and second lower limit values being set when the present location is on the expressway are higher than the third lower limit value which is set when the present location is not on the expressway. Therefore, it is possible to increase frequency of the execution of the restoring control during the travel on the expressway where noise from the engine is easily confused with surrounding background noise. Therefore, it is possible to reduce driver's discomfort due to the execution of the restoring control.

According to the fifth aspect, when the actual state of charge is equal to or greater than the upper limit value, the maintaining control in which the state of charge is maintained at the upper limit value is executed. Therefore, it is possible to prevent overcharge of the battery from occurring and to extend life of the battery.

According to the sixth aspect, the second upper limit value which is set when the destination has not been input is higher than the first upper limit value which is set when the destination has been input. Therefore, in the case where the destination has not been input, the state of charge is maintained higher than the case where the destination has been input. Therefore, it is possible for the vehicle, after the travel on the expressway, to continue to travel for a long time only by driving the motor.

According to the seventh aspect, it is possible to execute the restoring control appropriately in the series hybrid vehicle.

DESCRIPTION OF EMBODIMENTS

Figure 1:
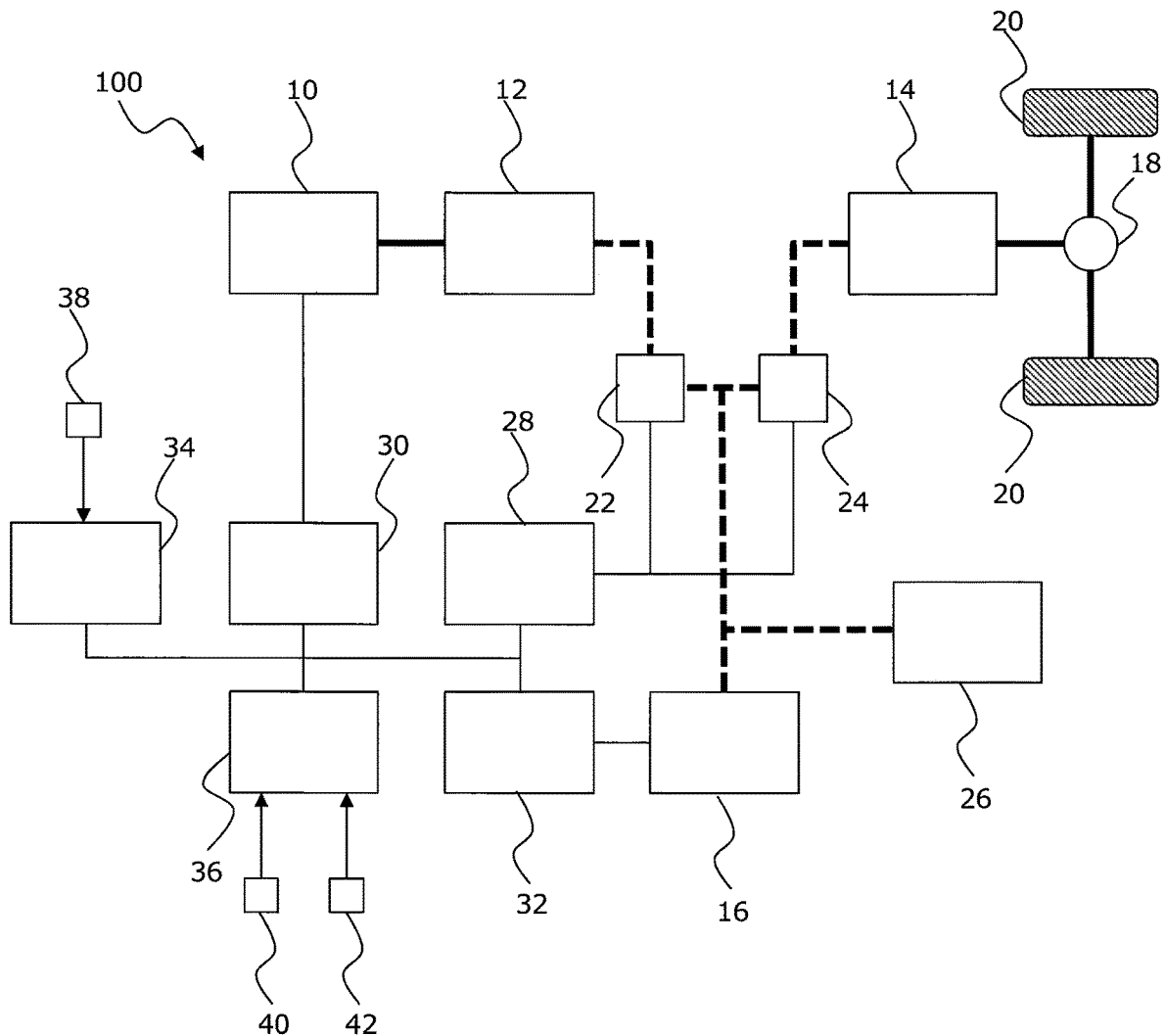
FIG. 1 is a diagram for illustrating an exemplary vehicle to which a control system according to an embodiment of the present disclosure is applied.

Hereinafter, an embodiment of the present disclosure will be described referring to the drawings. It should be noted that same signs are attached to same elements in the respective drawings, and duplicate descriptions are omitted.

1. Configuration of Control System

First, a configuration of a control system according to the present embodiment will be described with reference to FIG. 1. FIG. 1 is a diagram for illustrating an exemplary vehicle to which a control system 100 according to the present embodiment is applied. The vehicle shown in FIG. 1 is a series hybrid vehicle. However, the control system 100 may be applied to a range extender electric vehicle. The control system 100 may be applied to a parallel hybrid vehicle.

As shown in FIG. 1, a driving system of the control system 100 includes an engine 10, a motor for electrical power generation 12, a motor for driving 14, a battery 16, a deceleration mechanism 18, wheels 20, inverters 22 and 24, and a battery charger 26.

The engine 10 is an internal combustion engine in which thermal energy generated by burning mixed gas is converted into kinetic energy of moving body such as piston, thereby a driving force is outputted. Examples of fuel of the engine 10 include gasoline, light oil, and hydrogen fuel. The engine 10 is started by the motor for electrical power generation 12 when a demand for electrical power generation to the engine 10 is present. The engine 10 drives the motor for electrical power generation 12 with power generated in the engine 10. The engine 10 is stopped when the demand for electrical power generation is absent.

The motor for electrical power generation 12 is an electric rotating machine. The motor for electrical power generation 12 is, for example, constituted by a three-phase motor. The motor for electrical power generation 12 is directly connected to the engine 10. When the demand for electrical power generation is present, the motor for electrical power generation 12 operates as an electric motor to start the engine 10. During the operation of the engine 10, the motor for electrical power generation 12 operates as a generator to convert the power from the engine 10 to electrical power.

Like the motor for electrical power generation 12, the motor for driving 14 is an electric rotating machine. The motor for driving 14 is connected to the wheels 20 via a deceleration mechanism 18. The motor for driving 14 operates mainly as an electric motor to drive wheels 20 of the vehicle. When the vehicle is decelerated, the motor for driving 14 operates as a generator to generate regenerative power.

The battery 16 is a rechargeable direct-current power source. The battery 16 is consisted of a secondary battery such as a nickel-hydrogen battery and a lithium-ion battery. The battery 16 stores the electrical power generated by the motor for electrical power generation 12 and the electrical power regenerated by the motor for driving 14. The battery 16 supplies the stored electrical power to the motor for driving 14. The battery 16 also supplies the stored electrical power to the motor for electrical power generation 12 as an engine starter.

The inverter 22 is an inverter for the motor for electrical power generation 12. The inverter 22 is provided between the motor for electrical power generation 12 and the battery 16. The inverter 22 performs bidirectional conversion between DC power and AC power. The inverter 24 is an inverter for the motor for driving 14. The inverter 24 is provided between the motor for driving 14 and the battery 16. The inverter 24 performs bidirectional conversion between DC power and AC power.

One end of the battery charger 26 is connected to the battery 16. The other end of the battery charger 26 is connected to an external power source (not shown). During the vehicle is parked, the battery charger 26 converts the electrical power supplied from the external power source into voltage level of the battery 16 and then outputs the converted electrical power to the battery 16.

In addition, as shown in FIG. 1, a control system of the control system 100 includes a motor/generator controller 28, an engine controller 30, a battery controller 32, a navigation controller 34, and a unified controller 36. Each of the controllers is a microcomputer including a CPU (Central Processing Unit), a memory, input/output ports, and the like.

The motor/generator controller 28 operates the inverter 22 to control input and output torque of the motor for electrical power generation 12 in accordance with an instruction for control from the unified controller 36. The motor/generator controller 28 also operates the inverter 24 to control input and output of the motor for driving 14 in accordance with the instruction for control.

The engine controller 30 operates various actuators to control output torque of the engine 10 in accordance with the instruction for control from the unified controller 36. Examples of the various actuators include a throttle valve, an ignition apparatus, and an injector. When the throttle valve is operated, an amount of intake air is adjusted. When the ignition apparatus is operated, ignition timing is adjusted. When the injector is operated, an amount of fuel is adjusted.

The battery controller 32 estimates an internal-state amount such as a state of charge (SOC) of the battery 16 and power that is able to input to the battery 16 or output from the battery 16. The SOC is expressed as a percentage of current amount of charge of the battery 16 to full amount of charge of the battery 16. The SOC is calculated, for example, based on output voltage detected by a voltage sensor (not shown). Alternatively, the SOC is calculated based on an input/output current detected by a current sensor (not shown).

The navigation controller 34 combines the information on the present location and the map information to provide a travel guidance. The information on the present location is measured using a GPS device 38 that receives GPS signals from satellites. The map information is read from a non-volatile memory such as a HDD (not shown). Examples of the map information include type of a road (e.g., a public highway or an expressway), a gradient of the road, and curvature of the road. When a destination is input by a driver of the vehicle, the navigation controller 34 searches the travel route from the present location to the destination and executes the travel guidance.

The unified controller 36 controls an output of the motor for driving 14 in accordance with a demand from the driver while coordinating the controllers 28, 30, 32 and 34, and controls the output of the engine 10 (i.e., the output of the motor for electrical power generation 12) while considering both drivability and fuel economy. The SOC management control to be described below is executed by the unified controller 36.

2. SOC Management Control

In the SOC management control, the output of the engine 10 (i.e., the output of the motor for electrical power generation 12) and that of the motor for driving 14 are controlled such that the SOC of the battery 16 falls within a desired range. In the control system according to the present embodiment, the SOC management control is executed using the information on the present location and the map information.

2.1 SOC Management Control in Public Highway

Figure 2:
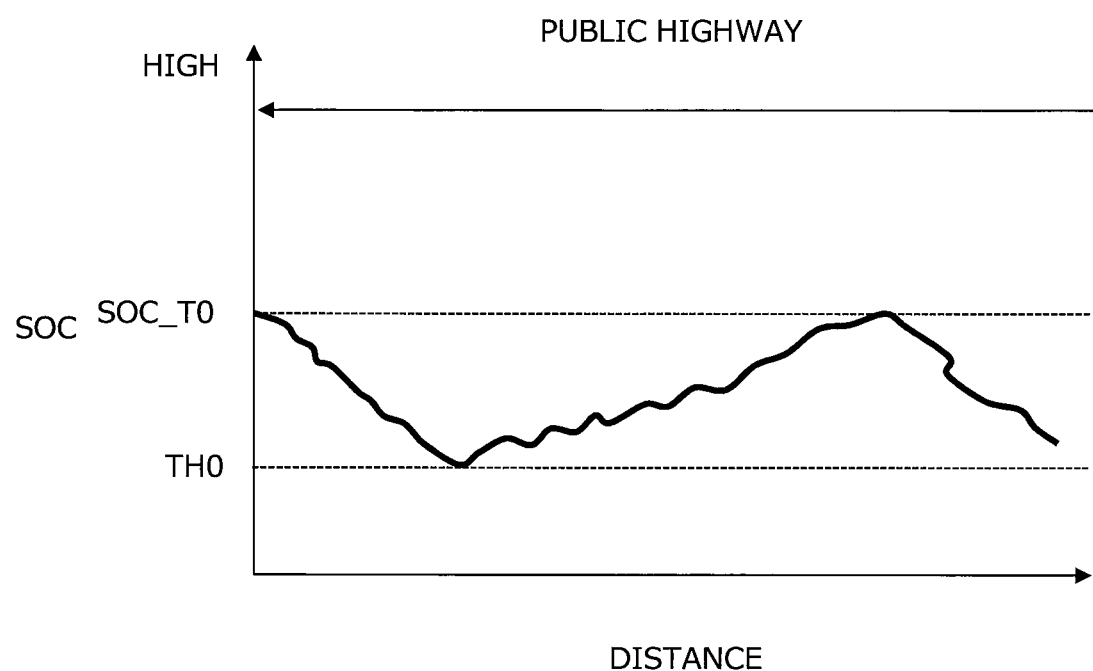
FIG. 2 is a time chart for explaining SOC management control executed in a public highway.

FIG. 2 is a time chart for explaining the SOC management control in the public highway. The public highway includes roads in an urban area. In the public highway, the vehicle travels at low or medium speed mainly based on the operation of the motor for driving 14 only. For this reason, the SOC gradually decreases as shown in FIG. 2. However, even during the travel in the public highway, if the SOC drops to a threshold TH0 or lower, control for restoring the SOC (hereinafter also referred to as "restoring control") is executed.

In the restoring control in the public highway, a target value of the SOC for public highway (hereinafter also referred to as a "SOC_T0") is set. Then, operating points of the engine 10 are set for the SOC_T0 by considering atmospheric pressure, engine thermal efficiency, generator efficiency, and the like. When the SOC rises to or above the SOC_T0, the operation of the engine 10 is terminated. That is, the electrical power generation by the engine 10 is terminated. As described above, the SOC is managed between the threshold TH0 and the SOC_T0 during the travel in the public highway.

2.2 SOC Management Control in Expressway

The SOC management control in the expressway is controlled differently depending on whether or not the destination has been input by the driver.

(1) In a Case where the Destination has been Input

If the destination has been input, the restoring control is also executed. However, in this case, a first target value of the SOC for expressway (hereinafter also referred to as a "SOC_T1") is set. In this case, further, control for maintaining the SOC (hereinafter also referred to as "maintaining control") is executed in addition to the restoring control. In this maintaining control, the SOC is maintained at the SOC_T1.

(i) Restoring Control

Figure 3:
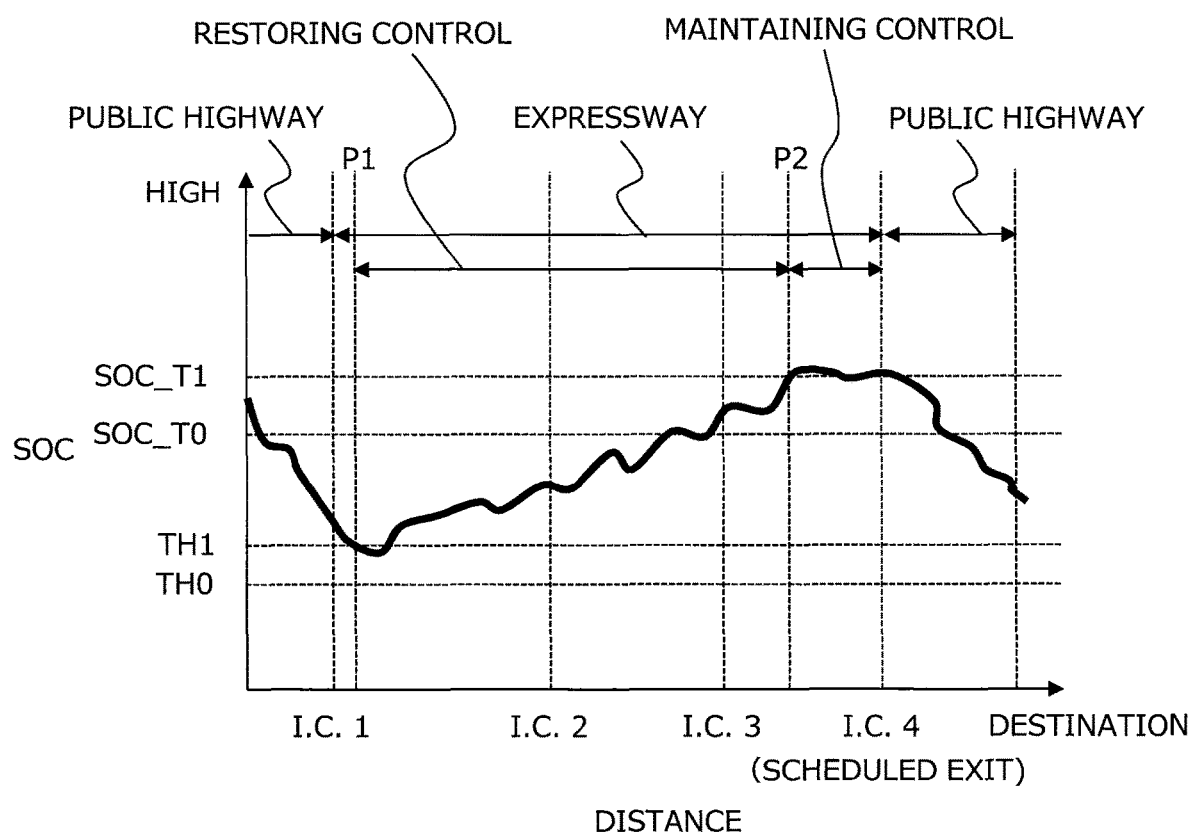
FIG. 3 is a time chart for explaining the SOC management control executed in an expressway when a destination has been input.

FIG. 3 is a time chart for explaining the SOC management control in the expressway in a case where the destination has been input. The expressway includes roads which do not have any intersection points. The expressway allows entry and exit of vehicles from the public highway at interchanges. In the expressway, a steady travel at high speed is generally performed. Therefore, during the travel in the expressway, the restoring control is started earlier than that in the public highway. A threshold TH1 shown in FIG. 3 is a determination value for determining whether or not to start the restoring control. The threshold TH1 is set to a value higher than the threshold TH0 described in FIG. 2.

In the example shown in FIG. 3, the SOC drops to a threshold TH1 at a position P1 on the expressway. Therefore, the restoring control is started from this position P1. In the restoring control, the SOC_T1 is set. Then, the operating points of the engine 10 are set such that the SOC increases to the SOC_T1 before reaching an interchange exit at which the vehicle is scheduled to exit from the expressway (hereinafter also referred to as a "scheduled exit"). In the example shown in FIG. 3, the scheduled exit corresponds to an exit of an interchange 4.

For example, considering a distance to the scheduled exit, a gradient to the scheduled exit, an average speed of the vehicle, atmospheric pressure, an engine thermal efficiency, and a generator efficiency, operating points at which the SOC_T1 is achieved with smallest fuel consumption are determined as the operating points of the engine 10. It should be noted that a well-known method can be used as the method for determining such the operating points.

(ii) Maintaining Control

The maintaining control is executed when the SOC is equal to or greater than the SOC_T1. The SOC_T1 is the target value of the SOC in the restoring control, and is also the determination value for determining whether or not to start the maintaining control. The maintaining control is executed until the vehicle reaches the scheduled exit.

In the example shown in FIG. 3, the SOC exceeds the SOC_T1 at a position P2 in front of the scheduled exit. Therefore, at this position P2, the restoring control is terminated and the maintaining control is started. In the maintaining control, for example, the electrical power generated by the motor for electrical power generation 12 is discharged as heat. Alternatively, in the maintaining control, the engine 10 is operated in a operating point less efficient than the present operating point. Alternatively, in the maintaining control, an intermittent operation is performed in which the operation of the engine 10 is started and stopped as appropriate. As a result, the SOC is maintained to be in a vicinity of the SOC_T1.

(2) Specific Processing Executed when the Destination has been Input

Figure 4:
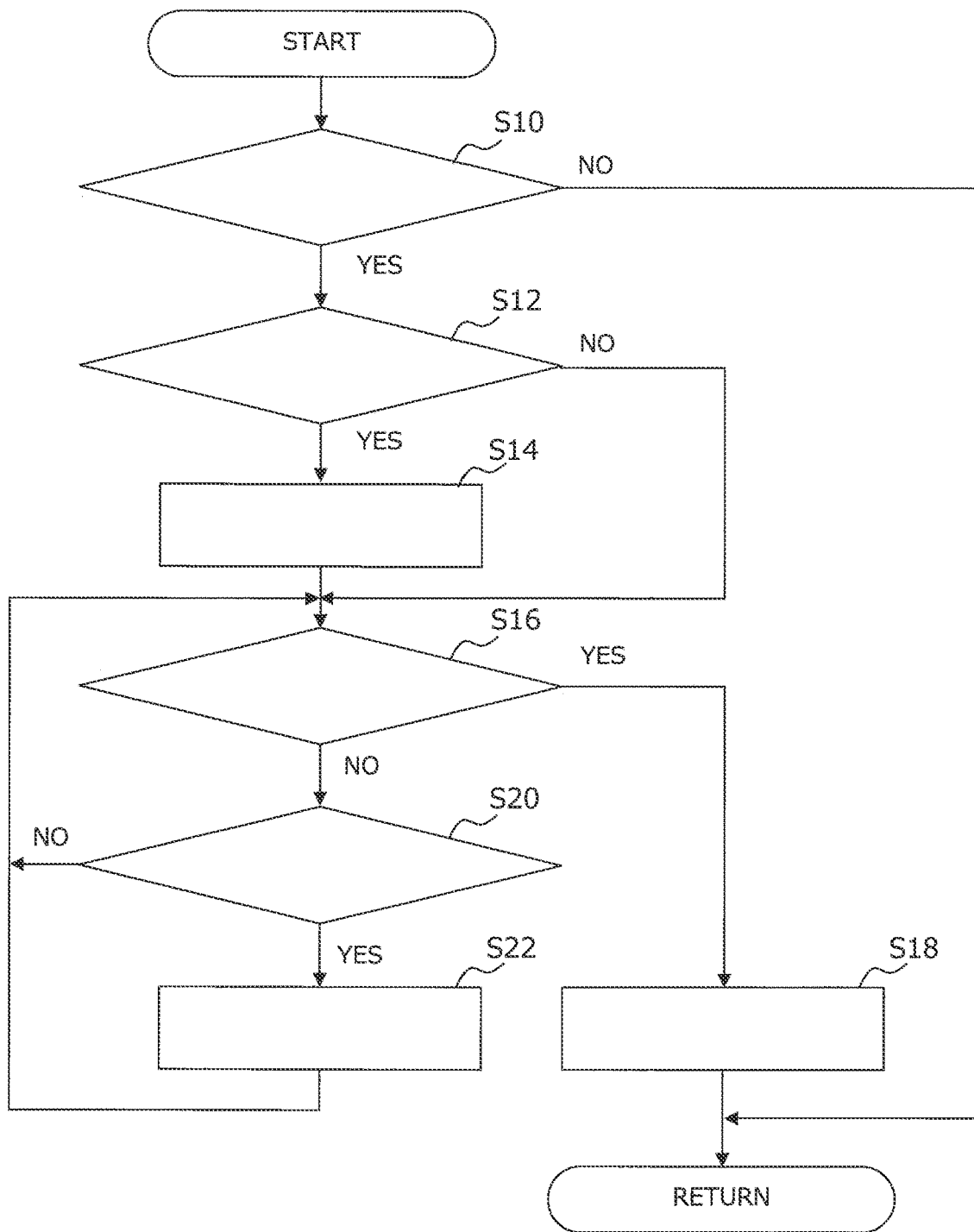
FIG. 4 is a flow chart for explaining processing flow of the SOC management control executed when the destination has been input.

FIG. 4 is a flow chart for explaining processing flow of the SOC management control executed when the destination has been input. Note that the processing routine shown in FIG. 4 is repeatedly executed at a predetermined control cycle when the destination has been input during the travel of the vehicle.

In the routine shown in FIG. 4, first, it is judged whether or not the present location is on the expressway (step S10). The processing of the step S10 is executed based on the information on the present location and the map information. If the judgement result of the step S10 is negative, the processing routine is terminated.

If the judgement result of the step S10 is positive, it is judged whether or not an actual SOC is less than or equal to the threshold TH1 (step S12). The actual SOC is an actual state of charge of the battery 16. For the actual SOC, values calculated by the battery controller 32 are used. If the judgement result of the step S12 is negative, the processing shown in the step S16 is executed.

If the judgement result of the step S12 is positive, the restoring control is executed (step S14). On the beginning of the restoring control, the SOC_T1 is set and the operating points of the engine 10 by which the SOC is increased from the current value (i.e., present actual SOC) to the SOC_T1 with smallest fuel consumption.

Subsequent to the step S12 or S14, it is judged whether or not the vehicle has reached the scheduled exit (step S16).

The processing of the step S16 is executed based on the information on the present location and the map information. If the judgement result of the step S16 is positive, the ongoing SOC management control is terminated (step S18). The ongoing SOC management control corresponds to the restoration or maintaining control. If the judgement result of the step S12 is negative and that of the step S16 is positive, the SOC management control is not executed. On other cases, the restoring or maintaining control is executed. The processing of the step S18 is executed only if the ongoing SOC management control is present.

If the judgement result of the step S16 is negative, it is judged whether or not the actual SOC is equal to or greater than the SOC_T1 (step S20). For the actual SOC, the value calculated by the battery controller 32 is used. If the judgement result of the step S20 is negative, the processing of the step S16 is executed. In this case, the restoring control is continuously executed.

If the judgement result of the step S20 is positive, the maintaining control is executed (step S22). On the beginning of the maintaining control, the restoring control is terminated. After the processing of the step S22, the processing of the step S16 is executed.

(3) In a Case where the Destination has not been Input

Similar to the case where the destination has been input, the restoring and maintaining control are executed even when the destination has not been input. However, in this case, the restoring control is started based on a threshold T2 which is different from the threshold T1. In addition, in the restoring control, a second target value of the SOC for expressway (hereinafter also referred to as a "SOC_T2") is set. In addition, in the maintaining control, the SOC is maintained at the SOC_T2.

(i) Restoring Control

Figure 5:
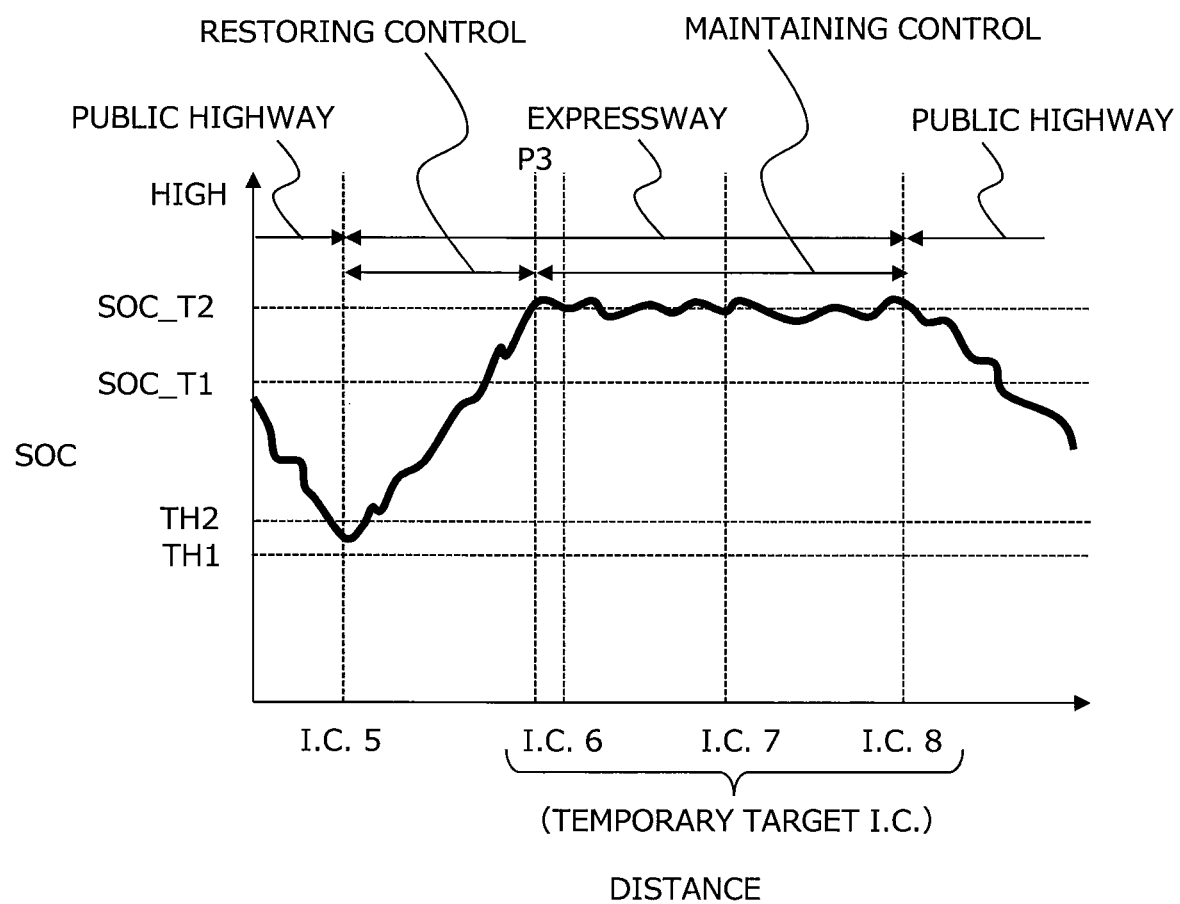
FIG. 5 is a time chart for explaining the SOC management control executed in the expressway when the destination has not been input.

FIG. 5 is a time chart for explaining the SOC management control in the expressway when the destination has not been input. As shown in FIG. 5, the threshold TH2 is set to a value higher than the threshold TH1 described in FIG. 3. The reason for this is that, when the destination has not been input, it is unclear which interchange exit the vehicle will pass through and how far the vehicle will travel in the public highway after passing through the interchange exit. Therefore, in the case without the destination, the determination value for determining whether or not to start the restoring control is set to the threshold TH2 (>the threshold TH1). In addition, in the case without the destination, the restoring control is started earlier than the case with the destination.

In the example shown in FIG. 5, the SOC is less than or equal to the threshold TH2 SOC at an entrance position of the expressway (i.e., the entrance position of the interchange 5). Therefore, in this example, the restoring control is started at the same time as the travel in the expressway is started. In the restoring control, the SOC_T2 is set. Then, the operating points of the engine 10 are set such that the SOC increases to the SOC_T2 before reaching a next interchange exit of the expressway (In the example shown in FIG. 5, the next interchange exit corresponds to an exit of an interchange 6). In other words, the restoring control is executed by setting the next interchange exit as a temporary destination.

Note that, even when the destination has not been input, the operating points of the engine 10 are determined at the beginning of the restoring control.

In the example shown in FIG. 5, the SOC_T2 is set to a value higher than the SOC_T1 described in FIG. 3. The reason for this is that, when the destination has not been input, it is unclear how far the vehicle will travel in the public highway after passing through the interchange exit. Therefore, the target value of the SOC in the restoring control is set to the SOC_T2 (>the SOC_T1), thereby the SOC is restored more than the case where the destination has been input.

(ii) Maintaining Control

The maintaining control is executed when the SOC is equal to or greater than the SOC_T2. The SOC_T2 is set to the value higher than the SOC_T1. The reason for this is that, when the destination has not been input, it is unclear how far the vehicle will travel in the public highway after passing through the next interchange exit. Therefore, in the case without the destination, the determination value for determining whether or not to start the maintaining control is set to the SOC_T2 (>the SOC_T1). In addition, in the case without the destination, the SOC is restored to a higher value than the case with the destination. The maintaining control is executed until the vehicle passes through the exit of the expressway.

In the example shown in FIG. 5, the SOC exceeds the SOC_T2 at a position P3 in front of the interchange exit (i.e., the interchange exit of the interchange 6). Therefore, at this position P3, the restoring control is terminated and the maintaining control is started. The maintaining control is executed continuously until the vehicle passes through any interchange exit of the expressway. In the example shown in FIG. 5, the maintaining control is executed until the vehicle reaches the interchange exit of the interchange 8.

(4) Specific Processing Executed when the Destination has not been Input

Figure 6:
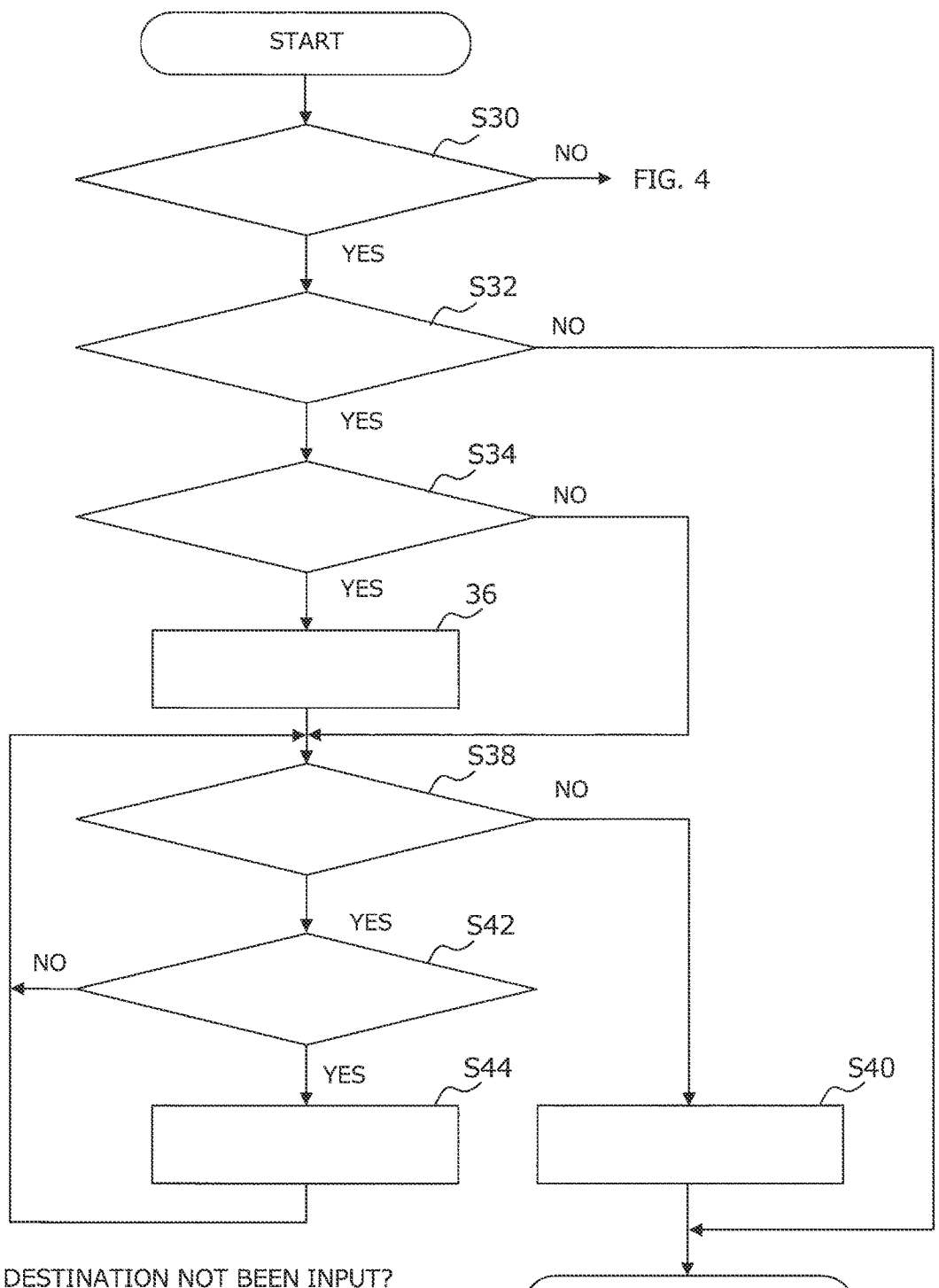
FIG. 6 is a flow chart for explaining processing flow of the SOC management control executed in the embodiment.

FIG. 6 is a flow chart for explaining processing flow of the SOC management control executed in the present embodiment. FIG. The processing routine shown in FIG. 6 is repeatedly executed at the predetermined control cycle during the travel of the vehicle.

In the routine shown in FIG. 6, first, it is judged whether or not the destination has not been input (step S30). If the judgement result of the step S30 is negative, the processing routine shown in FIG. 4 is executed.

If the judgement result of the step S30 is positive, it is judged whether or not the present location is on the expressway (step S32). The processing of the step S32 is executed based on the information on the present location and the map information. If the judgement result of the step S32 is negative, the processing routine is terminated.

If the judgement result of the step S32 is positive, it is judged whether or not the actual SOC is less than or equal to the threshold TH2 (step S34). For the actual SOC, the value calculated by the battery controller 32 is used. If the judgement result of the step S34 is negative, the processing of the step S38 is executed.

If the judgement result of the step S34 is positive, the restoring control is executed (step S36). On the beginning of the restoring control, the SOC_T2 is set and the operating points of the engine 10 by which the SOC is increased from the current value (i.e., the present actual SOC) to the SOC_T2 with the smallest fuel consumption.

Subsequent to the step S34 or S36, it is judged whether or not the present location is on the expressway the (step S38). If the judgement result of the step S38 is negative, the ongoing SOC management control is terminated (step S40). The processing of the steps S38 and S40 are basically the same as that of the steps S16 and S18 described in FIG. 4.

If the judgement result of the step S38 is positive, it is judged whether or not the actual SOC is greater than or equal to the SOC_T2 (step S42). For the actual SOC, the value calculated by the battery controller 32 is used. If the judgement result of the step S42 is negative, the processing of the step S38 is executed. In this case, the restoring control is executed continuously.

If the judgement result of the step S42 is positive, the maintaining control is executed (step S44). On the start of the maintaining control, the restoring control is terminated. After the execution of the processing of the step S44, the processing of the step S38 is executed.

3. Advantageous Effects

According to the SOC management control described above, when the destination has not been input, the next interchange exit is set as the temporary destination. Therefore, not only in the case with the destination, but also in the case without the destination, it is possible to execute the restoring control under the predetermined condition mentioned above.

Further, according to the SOC management control, in the case without the destination, the target value of the SOC in the restoring control (i.e., the SOC_T2) is set higher than that in the case with the destination. Therefore, in the case without the destination, it is possible to restore the SOC more than the case with the destination. Therefore, it is possible to continue to travel for a long time, after traveling along the expressway, only by driving of the motor for driving 14.

Furthermore, according to the SOC management control, in the case without the destination, the determination value for determining whether or not to start the restoring control (i.e., the threshold TH2) is set to the higher value than the case with the destination. Therefore, in the case without the destination, the restoring control is started earlier than the case with the destination. Therefore, it is possible to restore the SOC earlier.

Furthermore, according to the SOC management control, the determination values for determining whether or not to start the restoring control (i.e., the thresholds TH0, TH1 and TH2) are changed in accordance with the type of road. Therefore, frequency of executing the restoring control becomes relatively low in the public highway whereas it becomes relatively high in the expressway. Here, during the execution of the restoring control, noise is generated from the engine. However, background noise around the vehicle becomes larger during the travel at high-speed than that at low-speed. Therefore, during the travel at the high-speed, the noise from the engine is easily confused with the background noise. Therefore, if the frequency of executing the restoring control becomes relatively high in the expressway, it is possible to reduce driver's discomfort due to the execution of the restoring control.

Furthermore, according to the SOC management control, the maintaining control is executed during the travel in the expressway. Therefore, it is possible to prevent the battery 16 from being overcharged and to extend the life thereof.

Furthermore, according to the SOC management control, in the case without the destination, the determination value for determining whether or not to start the maintaining control (i.e., the SOC_T2) is set to the higher value than the case with the destination. Therefore, in the case without the destination, the SOC is maintained at the higher value than the case without the destination. Therefore, even when the case without the destination, it is possible to continue to travel for a long time, after traveling along the expressway, only by driving of the motor for driving 14.

4. Correspondence Between Aspect and Embodiment

In the above embodiment, the motor for driving 14 corresponds to the "motor" of the first aspect. The motor for electrical power generation 12 corresponds to the "generator" of the first aspect. The unified controller 36 corresponds to the "management controller" of the first aspect. The thresholds TH0, TH1 and TH2 correspond to the "lower limit value" of the first aspect. The SOC_T0, SOC_T1 and SOC_T2 correspond to the "restoring target value" of the first aspect. The SOC_T1 SOC_T1 to the "first target value" of the first aspect. The SOC_T2 corresponds to the "second target value" of the first aspect.

In the above embodiment, the threshold TH1 corresponds to the "first lower limit value" of the third aspect. The threshold TH2 corresponds to the "second lower limit value" of the third aspect. The threshold TH0 corresponds to the "third lower limit value" of the fourth aspect. The SOC_T1 corresponds to the "first upper limit value" of the sixth aspect. The SOC_T2 corresponds to the "second upper limit value" of the sixth aspect.

What is claimed is:

1. A control system for vehicle, comprising
an engine and a battery which are mounted on a vehicle;
a motor which is mechanically coupled to drive wheels of the vehicle, and is configured to receive electrical power from the battery and to generate a driving force for travel of the vehicle;
a generator which is mechanically coupled to the engine, and is configured to generate charging power of the battery with power of the engine;
a management controller which is configured to execute management control in which a state of charge of the battery is managed; and
a navigation controller which is configured to guide a travel route of the vehicle from a present location to a destination based on information on the present location and map information;
wherein the management control includes restoring control in which the engine is operated such that the state of charge of the battery is restored to a restoring target value, the restoring target value being set based on an actual value of the state of charge of the battery when the actual value of the state of charge becomes equal to or less than a lower limit value,
wherein, in the restoring control, the management controller is configured to:
judge whether or not the present location is on an expressway based on the information on the present location and map information;
judge whether or not a destination has been entered into the navigation controller;
upon judging that the present location is on the expressway and the destination has been entered into the navigation controller, set a first target value as the restoring target value for the vehicle passing through a scheduled exit of the expressway; and
upon judging that the present location is on the expressway and the destination has not been entered into the navigation controller, set a second target value as the restoring target value for the vehicle passing through a next exit of the expressway, and
wherein, in a case where the destination has not been entered into the navigation controller, the management controller is configured to start the restoring control earlier than in a case where the destination has been entered into the navigation controller.

2. The control system according to claim 1, wherein the second target value is higher than the first target value.

3. The control system according to claim 1, wherein:
the lower limit value includes a first lower limit value and a second lower limit value,
the first lower limit value is the lower limit value that is set when the destination has been entered into the navigation controller and the present location is on the expressway,
the second lower limit value is the lower limit value that is set when the destination has not been entered into the navigation controller and the present location is on the expressway, and
the second lower limit value is higher than the first lower limit value.

4. The control system according to claim 3, wherein:
the lower limit value further includes a third lower limit value which is the lower limit value that is set when the present location is not on the expressway, and
the first and second lower limit values are higher than the third lower limit value.

5. The control system according to claim 1, wherein the management control further includes maintaining control in which the restoring target value is maintained at an upper limit value when the actual value of the state of charge becomes greater than or equal to the upper limit value.

6. The control system according to claim 5, wherein:
the upper limit value includes a first upper limit value and a second upper limit value,
the first upper limit value is the upper limit value that is set when the destination has been entered into the navigation controller and the present location is on the expressway,
the second upper limit value is the upper limit value that is set when the destination has not been entered into the navigation controller and present location is on the expressway, and
the second upper limit value is higher than the first upper limit value.

7. The control system according to claim 1, wherein the vehicle is a series hybrid vehicle.

* * * * *